United States Patent [19]

Mortier

[11] Patent Number: 5,239,486

[45] Date of Patent: Aug. 24, 1993

[54] BRAKE DIAGNOSTIC COMPUTER

[76] Inventor: Mark Mortier, 3105 11th Ave., Moline, Ill. 61265

[21] Appl. No.: 600,667

[22] Filed: Oct. 22, 1990

[51] Int. Cl.$^5$ .............................................. G06F 15/74
[52] U.S. Cl. .................................. 364/551.01; 73/121
[58] Field of Search ............. 364/550, 551.01, 424.03, 364/424.04, 431.11, 426.01; 73/73, 121, 117.2

[56] References Cited

U.S. PATENT DOCUMENTS

| | | | |
|---|---|---|---|
| 4,404,639 | 9/1983 | McGuire et al. | 364/424.04 |
| 4,441,359 | 4/1984 | Ezoe | 364/424.03 |
| 4,757,463 | 7/1988 | Ballou et al. | 364/551.01 |
| 4,967,381 | 10/1990 | Lane et al. | 364/551.01 |

FOREIGN PATENT DOCUMENTS

| | | | |
|---|---|---|---|
| 3212625 | 10/1983 | Fed. Rep. of Germany | 73/73 |
| 3816314 | 11/1989 | Fed. Rep. of Germany | 73/121 |

OTHER PUBLICATIONS

Automatic Inspection of Passenger Vehicle Brake Systems; Sisson et al.; Nov. 1977; pp. 119-127.

*Primary Examiner*—Parshotham S. Lall
*Assistant Examiner*—Michael Zanelli
*Attorney, Agent, or Firm*—Mark A. Appleton

[57] ABSTRACT

A comprehensive brake testing method and device is provided which is specific for the vehicle in question; wherein the manufacture's brake specifications for each vehicle model are stored on a data bank linked with the device, and the make, model, and year of the vehicle to be tested is input into the device which device steps the operator through a series of visual and measured tests with the results of such tests being entered into the device either manually via a keyboard or automatically from computer interfaced torque wrenches hydrometers and/or micrometers. The results are compared to the manufacture specifications and additional testing or repair is recommended by the device as required.

2 Claims, 9 Drawing Sheets

FIG.9

BRAKE DIAGNOSTIC COMPUTER

REFERENCE TO APPENDIX

An Appendix to this patent application, comprising six sheets of computer program listings illustrating a preferred embodiment of the computer software code contemplated by the invention disclosed herein is appended hereto.

BACKGROUND OF THE INVENTION

This invention relates to a method and device for throughly testing the braking system of a vehicle so as to identify any deficiency in performance of the brake system and also identify the cause of such deficiency so that such deficiency may be repaired and the cause eliminated.

Heretofore, brakes were customarily tested in a shop on a roller/torque device wherein the vehicle's wheels were placed on a pair of rollers driven by a torque motor that drives the wheels at a constant speed. While the wheels are turning, the vehicle brakes are applied and the magnitude of the torque drive required to rotate the rollers is then measured. Such measurement gives a measurement of the vehicle's brake force and thus an indication of brake performance. Such tests were often augmented, especially if brake performance was low, by a visual inspection of the vehicle's brakes which involves removal of the wheel and visual examination of the brake parts.

The prior methods were highly subjective and the results varied as to whether operation was within normal limits based upon the mechanic's interpretation of the appearance. The variety of results were primarily due to the failure of the test as most methods of brake testing are less than a scientific diagnosis of brake related problems. The methods that are now common practice in the automotive repair aftermarket are far from complete or accurate.

To properly inspect a brake system on today's vehicles, technicians must follow a flow chart, or a specific step by step procedure to determine the exact condition of each components in the brake system. Because most technicians do a quick manual inspection of the vehicle's brake system and then make an educated guess as to the condition of each of the brake components, the current state of the art often gives an inacurrate result.

Normal testing methods also fail to address a crucial issue in brake performance, i.e. the integrity of the brake hydraulic condition. Brake line fluid absorbs water quite readily and any opening in an otherwise closed brake system provides an area where water may be taken up by the brake fluid. When water is found in the brake fluid it promotes corrosion of the parts of the system which will produce a failure of the system at that corroded part.

Additionally the prior methods of brake testing do not relate the state of the brakes or their performance to optimal vehicle specifications as established by the manufacturer.

SUMMARY OF THE INVENTION

Accordingly one object of the invention is to provide a mechanism for collecting data on a vehicle's brake system such as measurements of the actual brake pad placement and thickness so as to determine wear and damage and to compare such information to manufacturer specification. A further object of this invention is to measure the water content of the brake fluid at various points to determine the structural integrity of the brake lines and system. Another object of the invention is to provide a method of analysis whereby all salient information is collected and stored so that an accurate diagnosis as to the condition of a vehicle's brake system may be made. Such a method allows the mechanic to keep all test results organized while also accomplishing the objective of reminding the mechanic of all necessary tests that must be performed before an accurate diagnosis can be achieved.

By using the proper flow chart and procedures to diagnosis brake systems, the exact condition of the brake drums, brake rotors, brake linings, brake pads and brake hold down parts can accurately be determined. The inventive device has shown the most efficient and time saving way to diagnose brake condition is to follow a proper flow chart and to use a computer that prompts a technician in a logical step by step procedure to properly inspect the brake system components.

Automotive brake systems are comprised of two separate systems, the mechanical system consisting of the drums, brake rotors, brake linings, brake pads, brake hold downparts, and the hydraulic system that contains a master cylinder, wheel cylinders, calipers, brake lines and brake hoses.

The condition of master cylinders, wheel cylinders and calipers cannot accurately be determined even if a technician follows the best flow chart. The only way to be sure of their condition is to disassemble them and inspect the bore of each cylinder or the caliper piston. However, these hydraulic components most often fail because of oxidation or rust. Oxidation or rust occurs in these cylinders because the brake fluid is water absorbing, or hydroscopic. By using an electronic hydrometer as a component of the inventive device and by using the inventive method to measure the amount of water and contaminates in the brake fluid, an assessment of the condition of the master cylinder, wheel cylinders and the integrity of the hydraulic system can be made accurately and quickly.

DETAILED DESCRIPTION OF THE PREFERRED EMBODIMENT

Figure 1:
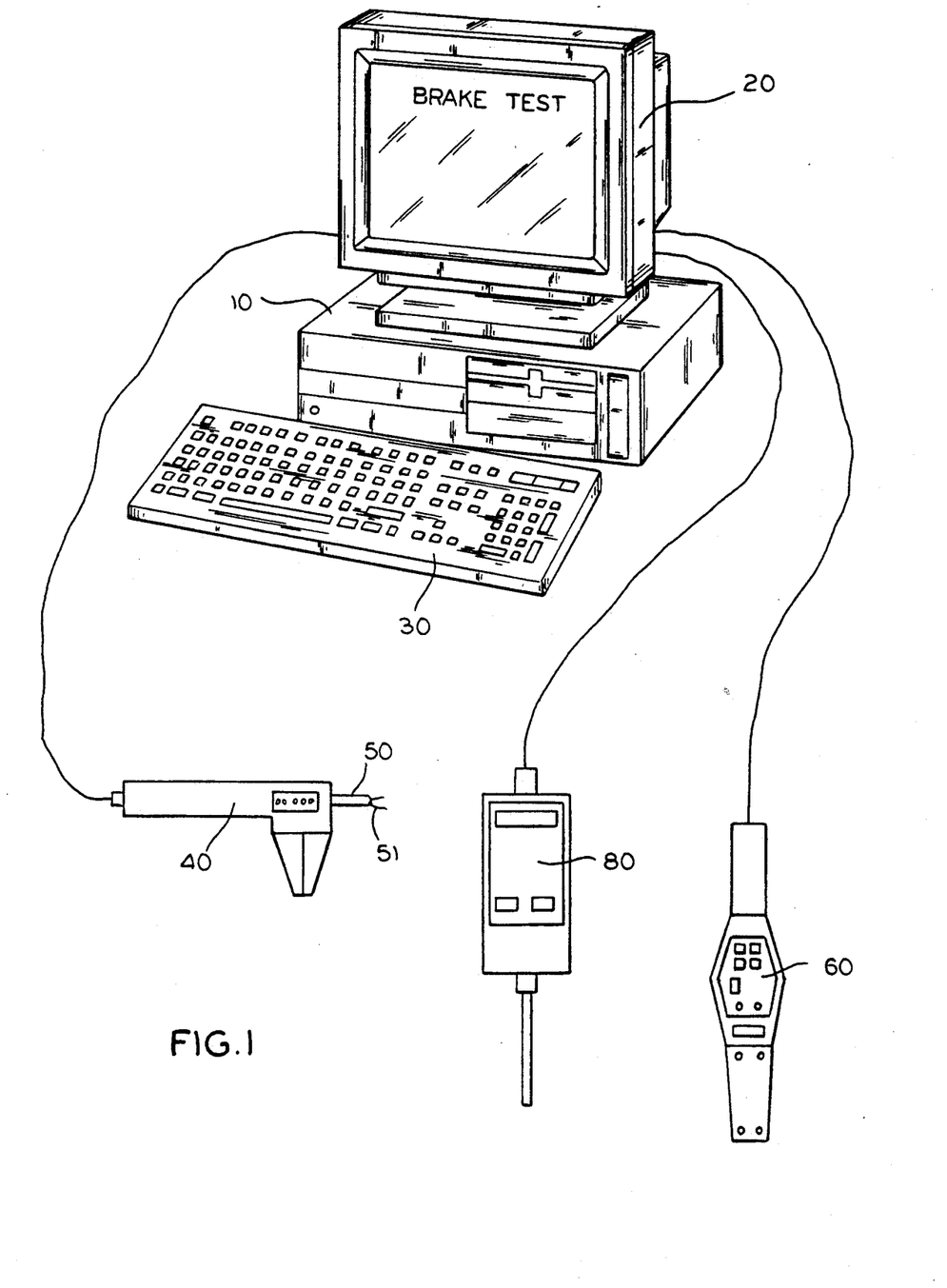
FIG. 1 is a plan view of the device showing the interrelationship of the various measuring instruments in the device.

In FIG. 1 the brake testing device is shown composed of a central processing unit CPU 10 which interfaces with a monitor 20, a keyboard for data entry 30, a micrometer 40, a hydrometer 50 and a torque wrench 60. The central processing unit 10 may be any of a variety of commercially available computers which may be programmed with a variety of commercially available operating systems that are able to receive the inputs from the keyboard 30, the electronic caliper 40, the electronic hydrometer 50, or the electronic torque wrench 60 and display the results of such inputs as well as outputs from the central processing unit 10 on a monitor 20.

In the preferred embodiment, a IBM 286 or IBM clone operating at 12 megahertz with two megabite random access memory on a hard disc drive which has been augmented with a VGA card, a 40 megabite seagate harddrive and a 3½"1.4 megabite floppy disc has been selected as the central processing unit. Such hardware, in the preferred embodiment, is booted up with a DOS operating system from Micro-Soft and augmented with drivers that allow the central processing unit 10 to interact with the various instruments which are component parts of the device; specifically the caliper 40, the hydrometer 50 and the torque wrench 60. Such drivers are commercially available from companies such as Borland International, Inc. of 1800 Green Hill Road, Scotts Valley, Calif. 95067. Such software is augmented by the specific program which has been appended to this patent application as Appendix A comprising six sheets of computer program listings and illustrating the preferred embodiment of the computer software code contemplated by the invention disclosed herein. In the preferred embodiment, a library of manufacturer's brake specifications is loaded into the CPU memory.

Figure 2:
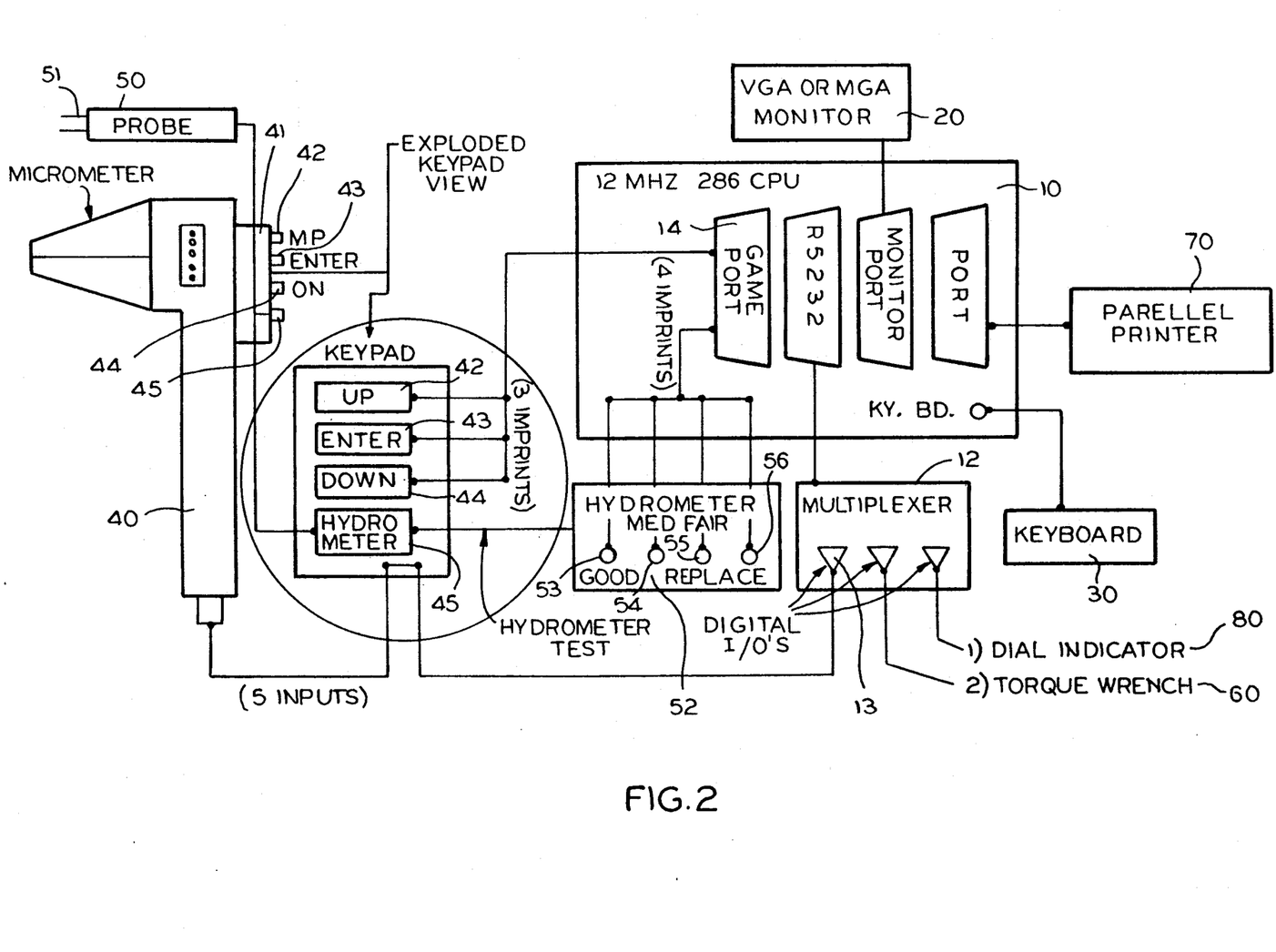
FIG. 2 is a schematic block diagram showing the connection of the various components of the brake testing device.

FIG. 2 shows in schematic form the interrelationships between the central processing unit 10, the VGA or MGA monitor 20, the keyboard input device 30, the micrometer or caliper 40, the hydrometer 50, the torque wrench 60, dial indicator 80, and the parallel printer 70.

Figure 3:
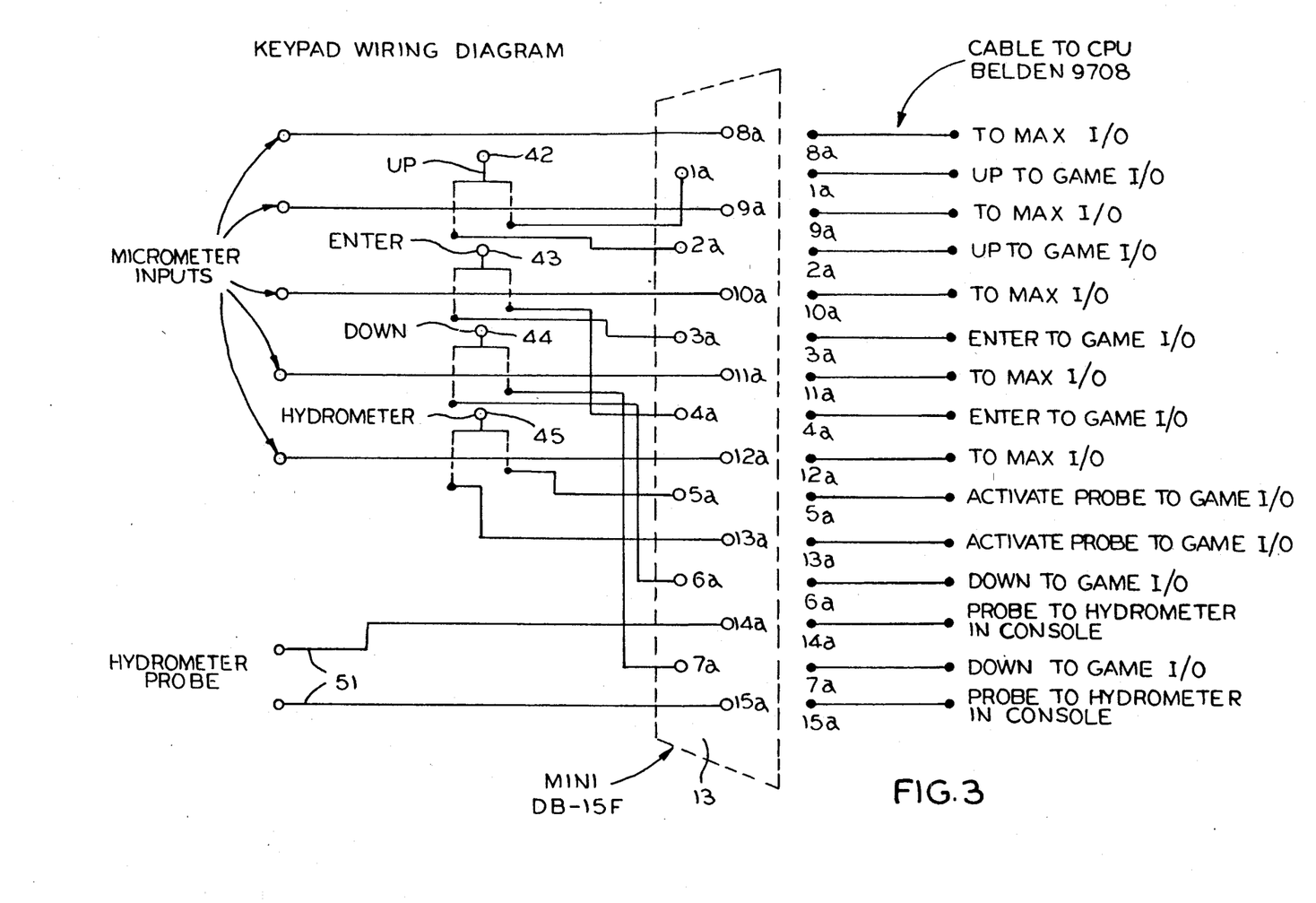
FIG. 3 is a schematic block diagram showing the interconnection of the keypad input device to the brake testing device.

FIG. 3 is a schematic block diagram of the interconnection between the inputs from the hydrometer 50 and micrometer 40 as they are wired through the multiplexer 12 at port 13 of multiplexer as well as game port 14 of the central processing unit 10 as shown in FIG. 2.

Figure 4:
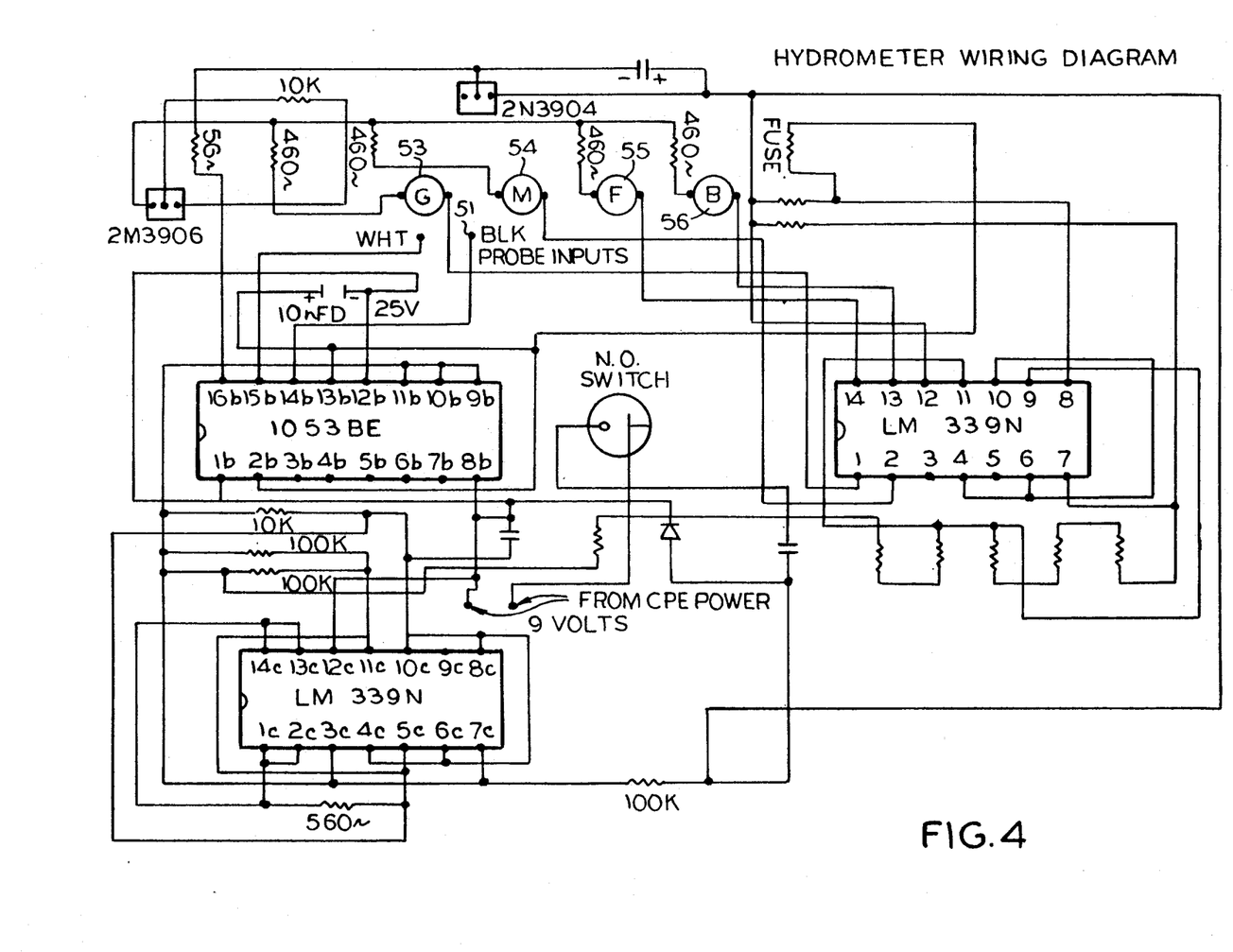
FIG. 4 is a schematic block diagram showing the interconnections of the hydrometer device with the brake testing device.
Figure 5:
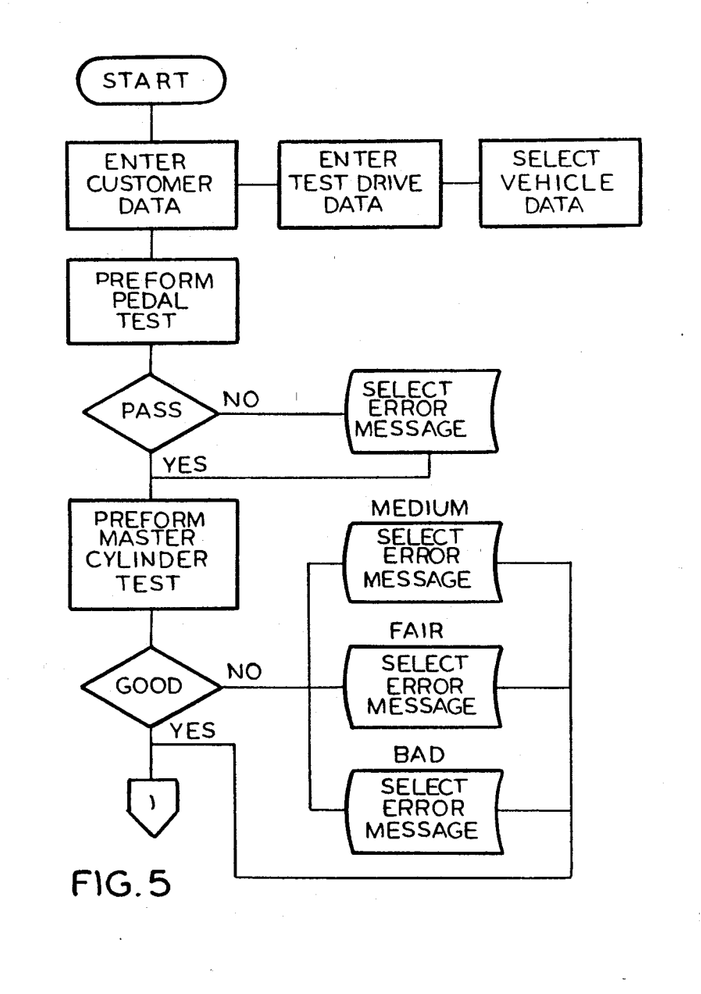
FIGS. 5 through 12 are flow diagrams of the diagnostic process.

FIG. 4 is a schematic block diagram showing the relationship within the hydrometer 50 as well as the wiring for the results obtained from a reading as shown in indicator lights 53 through 56.

Figure 6:
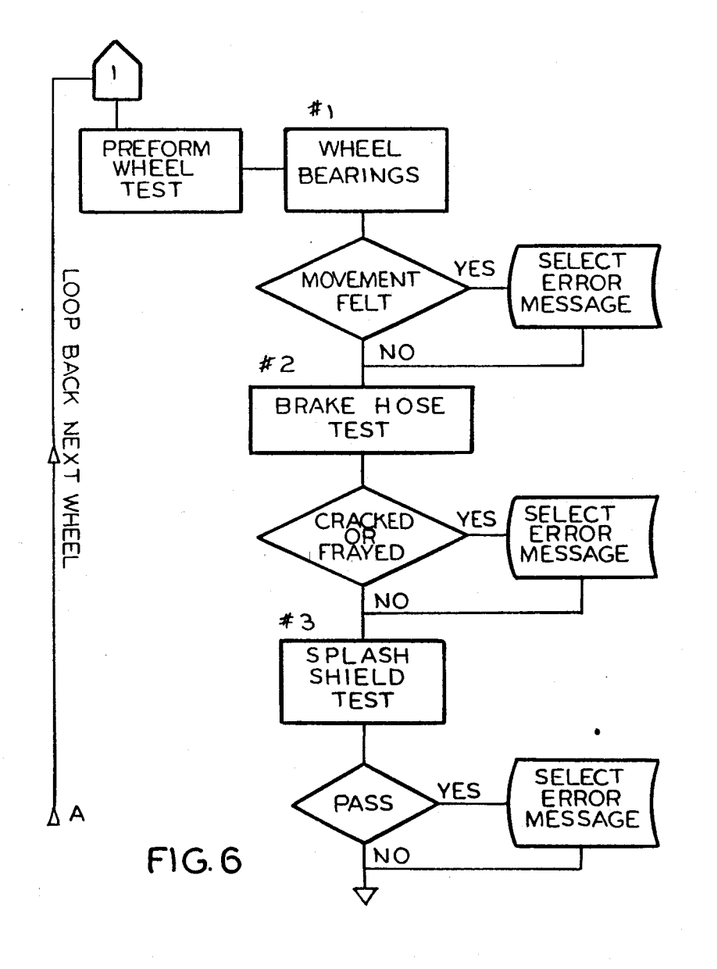
Figure 7:
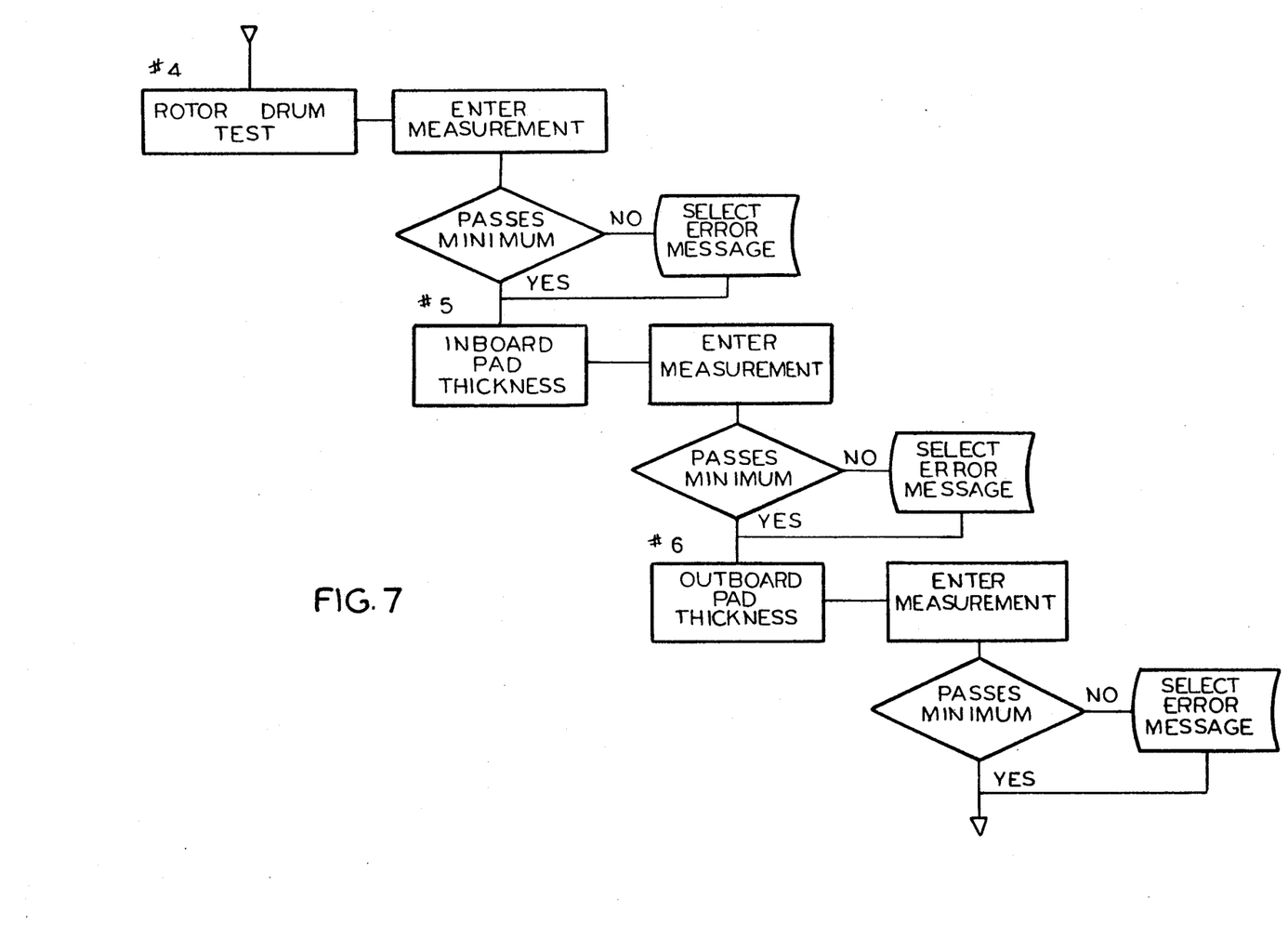

A more complete understanding of the inventive method and the use of the device may be had by reference to the flow diagrams in FIGS. 5 through 12. The analysis of a brake system is begun at FIG. 5 by entering into the CPU 10 from the keyboard 30 the identifying information as to the customer and any performance observations observed during a test drive of the vehicle in question. The program automatically calls up the manufactures specifications on the brake system for that vehicle's particular model from a data base stored in memory of the CPU 10. The technician is then prompted by the computer to perform a brake pedal test, the results of which are entered via the keyboard 30 into the program being run on CPU 10. The technician is then prompted to perform a master cylinder test by use of the hydrometer 50 and the results of the fluid analysis in that master cylinder, i.e., 6000 medium, fair or bad are entered into the program being run. As shown in FIG. 6, the technician is then prompted to perform a wheel test wherein the wheel bearings are checked for movement and the results entered into the program via the keyboard 30. The brake hoses are then visually inspected for cracking or frayed areas and the results are entered into the program via keypad 41 as shown in FIG. 2. As shown in FIG. 7, the rotor drum is measured by use of the micrometer or caliper 40 shown in FIG. 1. The micrometer 40 is used by either increasing the opening of the blades of the micrometer, or decreasing the span and the results are entered into the program automatically by pressing the enter button 43 on keypad 41. A comparison is made by the program with vehicle specifications from the manufacture's information stored in the data base and the program makes the determination as to whether the rotor drum for that wheel passes. Similar measurements are also done for the inboard brake pad and the outboard brake pad and the results compared to manufacture's specifications.

Figure 8:
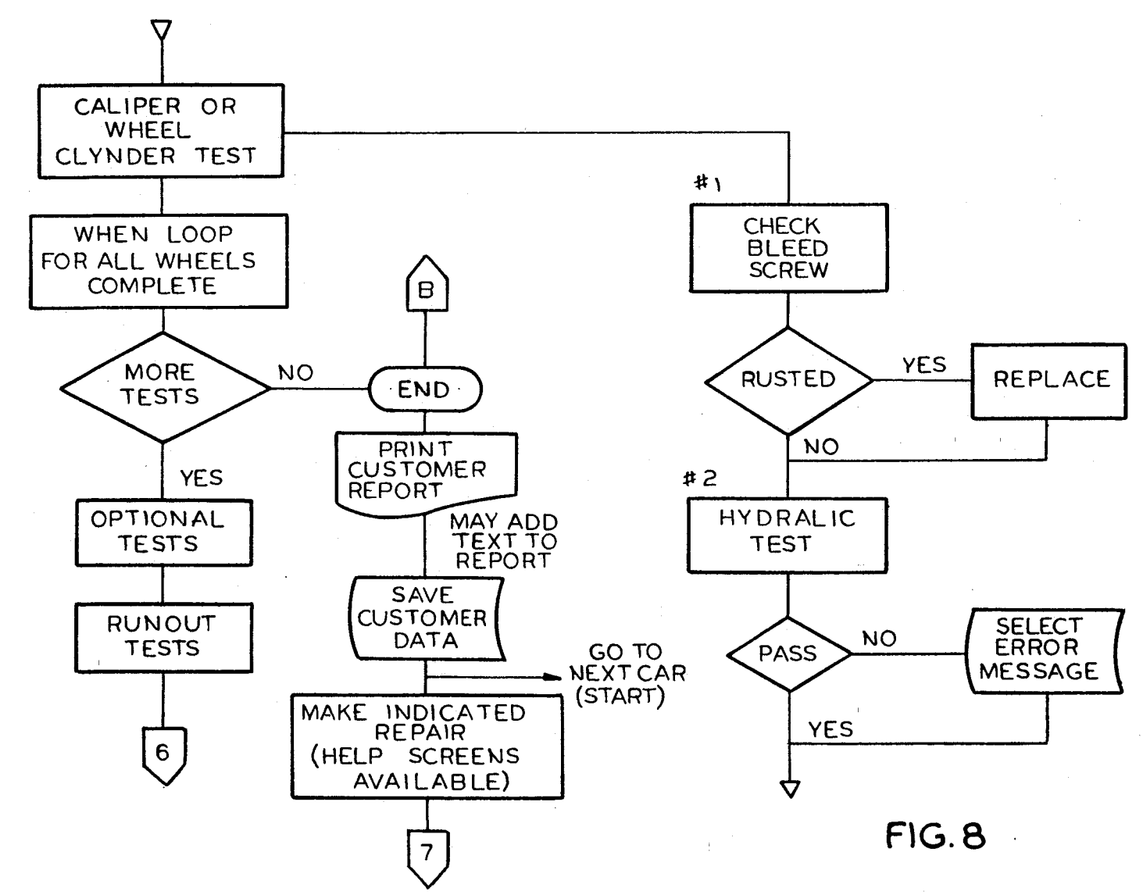

As shown in FIG. 8, the technician is then prompted to visually check the wheel cylinder bleed bleed screw for rust and the technician enters the results into the program. The technician is then prompted to check the wheel cylinder fluid by use of the hydrometer 50 shown in FIG. 1 and measure the water content of the brake fluid by setting switch 45 of the keypad 41 to show a hydrometer reading is being taken as shown in FIG. 2. The probe 51 of hydrometer 50 is then inserted into the fluid and the results of the test are shown on indication lights 53 through 56 which registers respectively good fluid 53, medium fluid 54, fair fluid 55, and bad fluid 56, which results are entered into the program by pressing key 43 of keypad 41.

Figure 9:
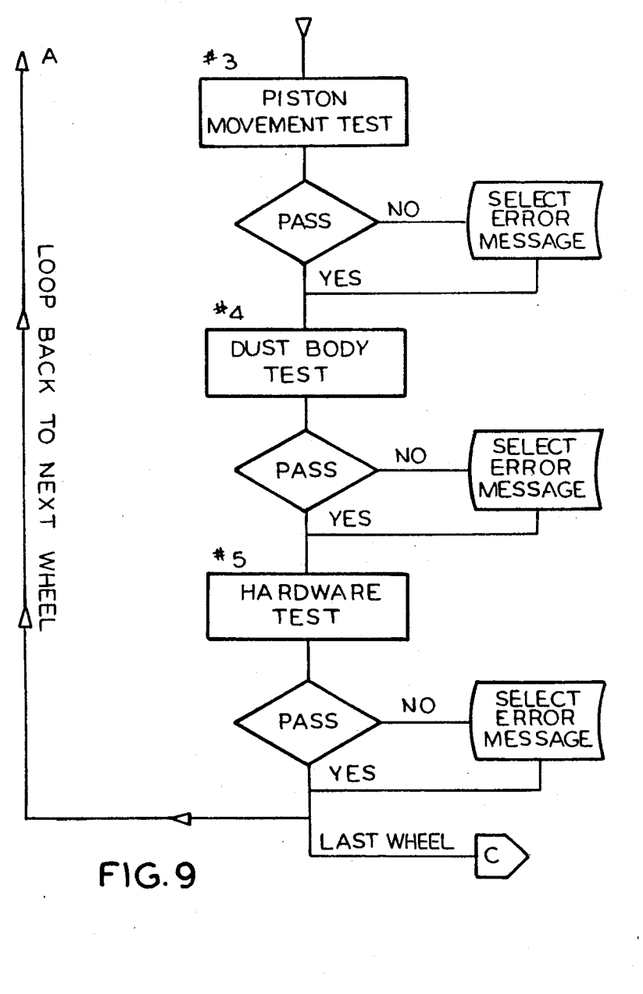
Figure 10:
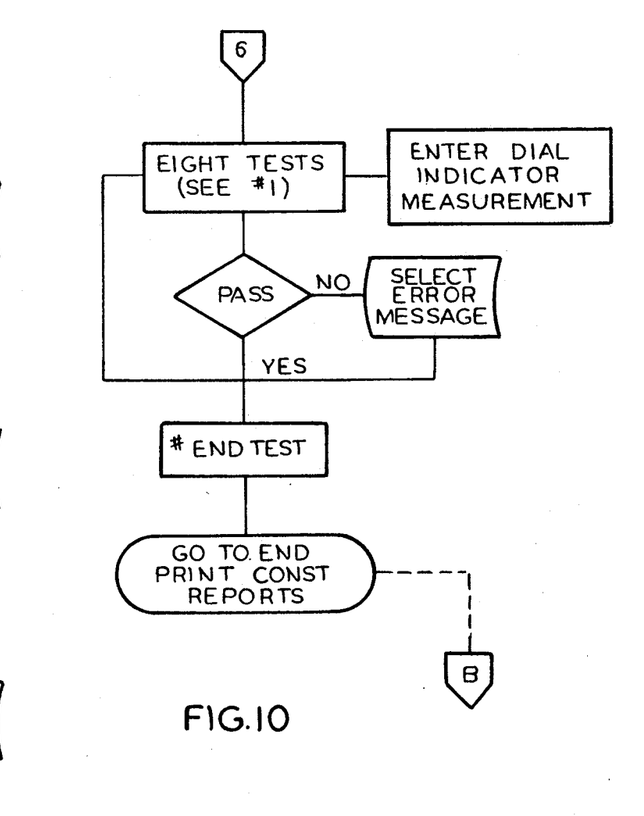
Figure 11:
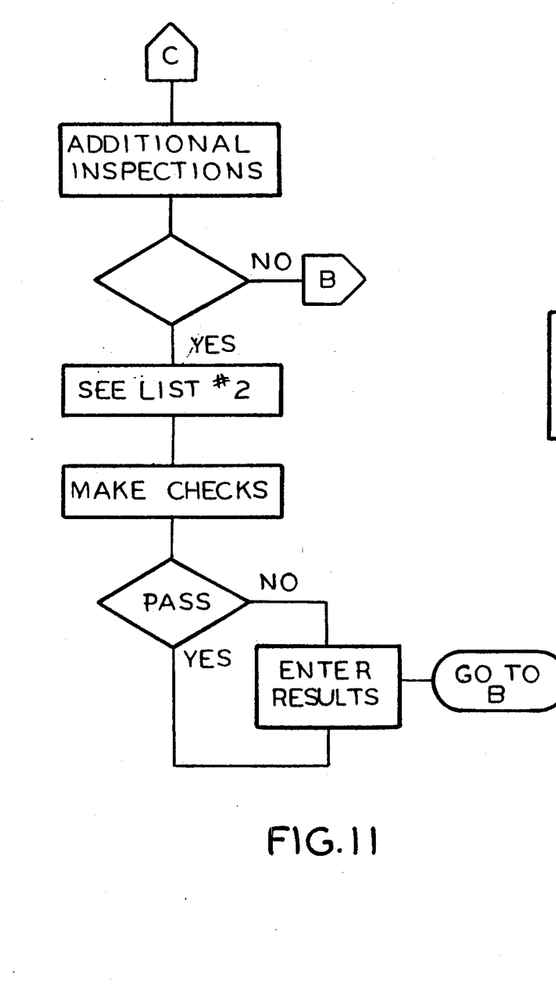
Figure 12:
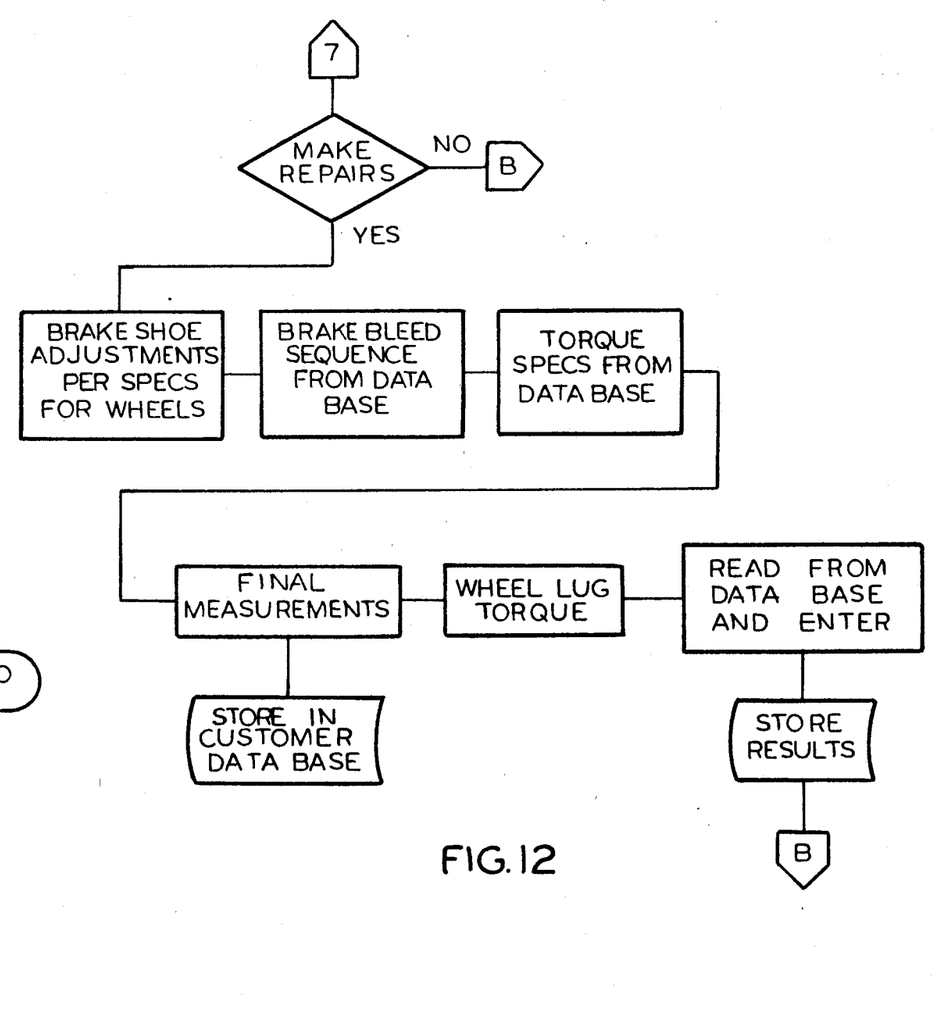

As shown in FIG. 9, the cylinder piston for that wheel is then checked visually for movement and the results entered into the program, the dust bout inspected defects and the results entered into the program. The remaining brake holddown hardware is inspected visually for defects with the results entered into the program. These tests are repeated for each wheel.

As shown in FIGS. 8, 10, 11 and 12, the results of the tests are compared to vehicle specifications from the manufacturer and a printout via printer 70 is made identifying the defects in the brake system. The technician is then prompted to make the repairs called for by the program. After such repairs are made a final check of the system is made by prompting the technician to recheck the areas repaired and a printout is made of the problems encountered and the repairs made via printer 70 FIG. 2. The wheels are re-assembled and the trueness of the rotor is checked by use of the dial indicator 80. The tires and rims are bolted back onto the wheel using the electronic torque wrench 60 which tightens the lug bolt nuts to the appropriate tightness.

The preferred embodiments of the present invention have been described herein and shown in the accompanying drawing to illustrate the underlying principles of the invention, but it is to be understood that a number of modifications or alternate embodiments may be made utilizing either the components described herein, the alternate components described herein, or their equivalents in a variety of combinations, all without departing from the spirit and scope of the invention.

APPENDIX A

```
1   /*****************************************************************\
2   *                                                                 *
3   * Filename    : instr.c                                           *
4   *                                                                 *
5   * Description : The functions in this file are associated with getting *
6   *               current values from the instruments.              *
7   *                                                                 *
8   * NOTE:       The torque wrench must be set to foot-pounds.  The  *
9   *             Digimatic and Micrometer may be set to either format; 0.001 *
10  *             inches will be returned irregardless.               *
11  *                                                                 *
12  * Software Engineer   : Paul Carlson                              *
13  * Date of Authorship  : September 1990                            *
14  * Date of Last Update : September 1990                            *
15  *                                                                 *
16  * 1990 ELTEC Inc.  2841 Dupont Ave. So.  Mpls, MN  55408 612-871-7936 *
17  \*****************************************************************/
18
19  /*****************************************************************\
20  *                                                                 *
21  *           (C) COPYRIGHT 1990  MJM Diagnostics, Inc.             *
22  *                      ALL RIGHTS RESERVED                        *
23  *                                                                 *
24  \*****************************************************************/
25
26  #include <asynch_2.h>
27  #include <conio.h>
28  #include <stdlib.h>
29  #include <stdio.h>
30  #include <dos.h>
31  #include <string.h>
32  #include <mem.h>
33  #include "instr.h"
34  #include "timers.h"
35  #include "globals.h"
36
37  #define   CR      13
38  #define   FALSE   0
39  #define   TRUE    1
40  #define   or      ||
41  #define   and     &&
42
43  JOYSTICK  JoyStick;
44
45  char      Error_String[65];
46  char      Port_Opened = 0;
47
48  static    void    COM_Error_Message   (int Error, char Status);
49  static    int     Stabalize_Input_Queue (int COM_Port         );
50  static    void    Initialize_COM_Port (int Port, int Baud, int Parity, int Data, int Stop);
51
52
53  /*---))) Print_Copyright (((---------------------------------------*/
54  /* This function displays the copyright notice.                   */
55
56  void Print_Copyright(void)
57  {
58      printf("MJM Diagnostics, Inc.\n");
59      printf("(C) COPYRIGHT 1990\n");
60      printf("ALL RIGHTS RESERVED\n");
61  }
62
63
64  /*---))) COM_Error_Message() (((-----------------------------------*/
65  /* This routine will copy the appropriate error message into the global */
66  /* variable Error_String.  Status being true indicates a port status error.*/
67  /* In order to keep the required string length of Error_String to a */
68  /* minimum, only one port status error in reported at one time.   */
69
70  void COM_Error_Message(int Error, char Status)
71  {
72      if (Status)
73      {
74          if      (Error & INPUT_LOST ) strcpy(Error_String,"Status Error: Incoming characters lost -- input queue filled");
75          else if (Error & ASYNCH_ERROR) strcpy(Error_String,"Status Error: Internal ASYNCH coding error");
```

```
76       else if (Error & PARITY    ) strcpy(Error_String,"Status Error: Parity error detected");
77       else if (Error & OVERRUN   ) strcpy(Error_String,"Status Error: Overrun error detected");
78       else if (Error & FRAMING   ) strcpy(Error_String,"Status Error: Framing error detected. Check Comm
         Parameters.");
79       else if (Error & BREAK     ) strcpy(Error_String,"Status Error: Break interrupt detected");
80       }
81    else
82       switch (Error)
83         {
84           case INV_PORT          : strcpy(Error_String,"Invalid port number, must be 1-4");    break;
85           case PORT_NOT_OPEN     : strcpy(Error_String,"Specified port is not open");          break;
86           case INV_PARAMETER     : strcpy(Error_String,"Invalid parameter specified");         break;
87           case NO_PORT_FOUND     : strcpy(Error_String,"No serial port at specified address"); break;
88           case OUT_Q_FULL        : strcpy(Error_String,"The output queue is full");            break;
89           case PORT_OPEN_ALREADY : strcpy(Error_String,"The port is already open");            break;
90           case IN_Q_EMPTY        : strcpy(Error_String,"Input queue is empty");                break;
91           case TIMEOUT           : strcpy(Error_String,"Timeout period expired");              break;
92           case CANCEL            : strcpy(Error_String,"Wait event cancelled by user");        break;
93           case NO_PORT_ADS       : strcpy(Error_String,"No default port address found");       break;
94           case NO_IRQ_AVAIL      : strcpy(Error_String,"No default IRQ line available");       break;
95           case BAD_BUFFER        : strcpy(Error_String,"Bad buffer size of address");          break;
96           case UNKNOWN_BAUD      : strcpy(Error_String,"Unknown baud rate divisor");           break;
97           case INV_OPT_PARAM     : strcpy(Error_String,"Invalid options parameter");           break;
98           case MEM_ALLOC_ERR     : strcpy(Error_String,"Error allocating memory");             break;
99           case INV_IN_Q_SIZE     : strcpy(Error_String,"Invalid value for input queue size");  break;
100          case INV_OUT_Q_SIZE    : strcpy(Error_String,"Invalid value for output queue size"); break;
101          case INV_INT_VALUE     : strcpy(Error_String,"Invalid value for interrupt level");   break;
102          case INV_BAUD_RATE     : strcpy(Error_String,"Invalid baud rate");                   break;
103          case INV_PARITY        : strcpy(Error_String,"Invalid parity specification");        break;
104          case INV_DATA_BITS     : strcpy(Error_String,"Invalid number of data bits");         break;
105          case INV_STOP_BITS     : strcpy(Error_String,"Invalid number of stop bits");         break;
106          case INV_REMOTE_FLOW   : strcpy(Error_String,"Invalid value for remote flow control"); break;
107          case INV_LOCAL_FLOW    : strcpy(Error_String,"Invalid value for local flow control");  break;
108          case INV_TRIMMING      : strcpy(Error_String,"Invalid value for bit trimming");      break;
109          case INV_FORCING       : strcpy(Error_String,"Invalid value for bit forcing");       break;
110          case INV_REQ_CTS       : strcpy(Error_String,"Invalid value for CTS");               break;
111          case INV_BREAK_TIME    : strcpy(Error_String,"Invalid break time");                  break;
112          case INTERNAL_ERROR    : strcpy(Error_String,"Internal level 2 Asynch error");       break;
113          case 501               : strcpy(Error_String,"Digimatic Error");                     break;
114          case 502               : strcpy(Error_String,"Microneter Error");                    break;
115          case 503               : strcpy(Error_String,"Torque Wrench Error");                 break;
116          case 504               : strcpy(Error_String,"No data received by PC Comm Port");    break;
117         }
118    }
119
120
121  /*---))) Stabalize_Input_Queue() (((---------------------------*/
122  /* This routine waits until the input queue is stabalized before returning. */
123
124  int Stabalize_Input_Queue(int COM_Port)
125    {
126      unsigned status;
127      int      size;
128      int      t1,t2,t3;
129      int      error = iwait_al(COM_Port,(long)36,&status,0);
130
131      if (error != A_OK)
132         { COM_Error_Message(504,FALSE);   return -1; }
133      else if (status != 0)
134         { COM_Error_Message(status,TRUE); return -1; }
135
136      t1 = 2048;
137      t2 = 4096;
138
139      do
140        {
141         delay(30);
142         error = qsize_al(COM_Port,&size,&status);
143         if (error != A_OK)
144            { COM_Error_Message(error,FALSE); return -1; }
145         else if (status != 0)
146            { COM_Error_Message(status,TRUE); return -1; }
147
148         t3 = t2;
149         t2 = t1;
150         t1 = size;
151
152        }
```

```
153         while (t1 != t3);
154
155         return 0;
156     }
157
158
159     /*--)))  Initialize_COM_Port()  (((----------------------------------*/
160     /* This routine will initialize a com port with the sent-in communication */
161     /* parameters.                                                        */
162
163     void Initialize_COM_Port(int Port, int Baud, int Parity, int Data, int Stop)
164     {
165         POPT popt;
166         int  error;
167
168         if ((error = open_a2(Port,128,128,0,0)) == PORT_OPEN_ALREADY)
169         {
170             close_a2(Port);
171             error = open_a2(Port,128,128,0,0);
172         }
173
174         if (error != A_OK)
175             COM_Error_Message(error,FALSE);
176
177         popt.baud_rate       = Baud;
178         popt.parity          = Parity;
179         popt.data_bits       = Data;
180         popt.stop_bits       = Stop;
181         popt.remote_flow_ctrl = A_DISABLE;
182         popt.local_flow_ctrl  = A_DISABLE;
183         popt.bit_trimming    = A_DISABLE;
184         popt.bit_forcing     = A_DISABLE;
185         popt.require_cts     = A_DISABLE;
186         popt.break_time      = 250;
187
188         if ((error = setop_a2(Port,&popt)) != A_OK)
189             COM_Error_Message(error,FALSE);
190     }
191
192
193     /*--)))  Read_Joystick  (((------------------------------------------*/
194     /* This routine reads the game card for joystick values.             */
195
196     void Read_Joystick(JOYSTICK *JoyStick)
197     {
198         union REGS regs;
199
200         memset(JoyStick,0,sizeof(JOYSTICK));
201
202         regs.h.ah = 0x84;      // Read joystick service.
203         regs.x.dx = 0x00;      // Get button status.
204
205         int86(0x15,®s, ®s);
206
207         JoyStick->B0 = (regs.h.al & 0x10) ? 0 : 1;
208         JoyStick->B1 = (regs.h.al & 0x20) ? 0 : 1;
209         JoyStick->B2 = (regs.h.al & 0x40) ? 0 : 1;
210         JoyStick->B3 = (regs.h.al & 0x80) ? 0 : 1;
211
212         regs.h.ah = 0x84;      // Read joystick service.
213         regs.x.dx = 0x01;      // Get resistive inputs.
214
215         int86(0x15,®s, ®s);
216
217         JoyStick->X0 = regs.x.ax;
218         JoyStick->Y0 = regs.x.bx;
219         JoyStick->X1 = regs.x.cx;
220         JoyStick->Y1 = regs.x.dx;
221
222     } /* Read_Joystick() */
223
224
225     /*--)))  Read_Instrument()  (((--------------------------------------*/
226     /* This routine controls all the instrumentation readings possible.  */
227
228     int Read_Instrument(char choice,long int *result)
229     {
230         int     error;
```

```
231      int      pterm;
232      int      pread;
233      int      qsize;
234      unsigned pstatus;
235      char     tries = 0;
236      long int oldresult = 0;
237      char     done;
238      char     inbuf[16];
239      char     out[8];
240      char     index;
241      TIMER_TYPE hydro_timer;
242
243
244      if (!Port_Opened)
245        {
246          Initialize_COM_Port(MULTI_PORT,BAUD_RATE,0,8,1);
247          Port_Opened = 1;
248        }
249
250      if (choice == HYDROMETER)
251        {
252
253          oldresult = 0;
254          (*result) = 4;
255          Start_Timer(&hydro_timer,0);
256
257          while ((*result) != oldresult)
258            if (Timed_Out(&hydro_timer))
259              {
260                Read_Joystick(&JoyStick);
261
262                if (JoyStick.B0)
263                  {
264                    oldresult = (*result);
265                    (*result) = HYD_GOOD;
266                  }
267                else if (JoyStick.B1)
268                  {
269                    oldresult = (*result);
270                    (*result) = HYD_FAIR;
271                  }
272                else if (JoyStick.B2)
273                  {
274                    oldresult = (*result);
275                    (*result) = HYD_MARGINAL;
276                  }
277                else if (JoyStick.B3)
278                  {
279                    oldresult = (*result);
280                    (*result) = HYD_BAD;
281                  }
282
283                Start_Timer(&hydro_timer,1);
284              }
285
286          return INST_OK;
287        }
288
289      else
290        {
291
292          do
293            {
294              done = 1;
295
296              /* flush the input queue */
297              if ((error = iflsh_al(MULTI_PORT)) != A_OK)
298                { COM_Error_Message(error,FALSE); return INST_ERROR; }
299
300              /* sends '1','2',or '3' to the multiplexer */
301              if ((error = wrtch_al(MULTI_PORT,48+choice)) != A_OK)
302                { COM_Error_Message(error,FALSE); return INST_ERROR; }
303
304              /* sends a carriage return to the multiplexer */
305              if ((error = wrtch_al(MULTI_PORT,13)) != A_OK)
306                { COM_Error_Message(error,FALSE); return INST_ERROR; }
307
308              if (Stabalize_Input_Queue(MULTI_PORT) == -1)
```

```
    return INST_ERROR;

/* reads to a carriage return or to 13 characters */
    if ((error = rdtrm_al(MULTI_PORT,13,CR,inbuf,&pters,&oread,&qsize,&pstatus)) != A_OK)
        { COM_Error_Message(error,FALSE); return INST_ERROR; } else if (pstatus != 0)
        { COM_Error_Message(pstatus,TRUE); return INST_ERROR; }

/* the carriage return wasn't encountered */
    else if (pters != 1)     { done = 0; tries++; continue; }

/* thirteen characters were not read */
    else if (pread != 13)    { done = 0; tries++; continue; }

/* checking the format of the returned characters */
    if (inbuf[0] != '0')     { done = 0; tries++; continue; } if (inbuf[1] != 48+choice) { done = 0; tries++; continue; } if (inbuf[2] != 'A')     { done = 0; tries++; continue; } if (inbuf[12] != CR)     { done = 0; tries++; continue; }

}
while (!done and (tries != 3));
/* allow three tries before reporting an error */ if (!done)
    { COM_Error_Message(500+choice,FALSE);  return INST_ERROR;} else if (choice == TORQUEWRENCH)
    {
    index = 3;
    while (inbuf[index++] != CR)
        out[index-4] = inbuf[index-1];
    out[index-4] = 0;

(*result) = (long int) (atof(out) * 1000.0);
    return INST_OK;
    } else         /* choice == DIGIMATIC or choice == MICROMETER    */
    {
    index = 3;
    while (inbuf[index++] != CR)
        out[index-4] = inbuf[index-1];
    out[index-4] = 0;

if (inbuf[7] == '.')                    /* is in inches     */
        (*result) = (long int) (atof(out) * 1000.0);
    else                                    /* is in millimeters */
        (*result) = (long int) (atof(out) * 1000.0 / 25.4);

return INST_OK;
    }
}
```

I claim:

1. A device for inspecting the braking system of a vehicle comprising:

(a) a computer for analyzing a vehicular braking system, (b) means, connected to said computer, for recalling and inputting the factory specifications of said braking system according to make and model of the vehicle being inspected;

(c) means for measuring at various points in the braking system the electrical conductivity value of the hydraulic fluid in said braking system and for generating and returning to said computer a corresponding measurement signal indicative of said measurement;

(d) means for measuring values of at least one of a group consisting of a thickness of materials in said braking system and a gap between points in said braking system and for generating and returning to said computer a corresponding measurement signal indicative of said measurement;

(e) means for testing a torque value at various points in said braking system and for generating and returning to said computer a corresponding measurement signal indicative of said measurement;

(f) means for recording in said computer visual observation values taken at various points in said braking system and for generating and returning to said computer a corresponding signal indicative of such observations;

(g) means in said computer for comparing the factory specifications stored in said computer to the measured and observed values and for determining whether the measured and observed values correspond with the factory specifications;

(h) means stored in said computer for recalling repair recommendations corresponding to the comparison between said factory specifications and said measuring, testing and visual observation values;

(i) means for inputting and recalling recommended procedures to alter the measured or observed values; and (j) means for outputting to a technician the results of such comparison as well as outputting recommended actions to take to correct deficiencies noted in said comparison.

2. A method of inspecting the braking system of vehicles comprising the steps of:

(a) directly measuring the values of at least one of a group consisting of the thickness of materials in said braking system and the gaps between points in said braking system, all of the group comparisons being various components in said vehicle braking system, and generating and returning to a computer corresponding signals indicative of such measurements;

(b) directly observing the condition of various components of said vehicle braking system and generating and returning to said computer corresponding signals indicative of said measurements;

(c) directly measuring the electrical conductivity of the hydraulic fluid at various points in said vehicle braking system and generating and returning to said computer corresponding signals indicative of said measurements;

(d) directly measuring the torque at various points in said vehicle braking system and generating and returning to said computer signals indicative of said measurements;

(e) comparing said measurement and observation signals stored in said computer with factory specification signals stored in the computer for the type of vehicle being inspected;

(f) displaying the results of such comparison and displaying on said computer corresponding recommendations as to what parts of said vehicle braking system, if any, needs to be repaired or replaced.

* * * * *